B. B. GRACE.
SIGNALING SYSTEM.
APPLICATION FILED SEPT. 5, 1918.

1,400,050.  Patented Dec. 13, 1921.

Inventor:
Bertram B Grace.
by J. E. Roberts  Atty.

UNITED STATES PATENT OFFICE.

BERTRAM B. GRACE, OF UPMINSTER, ENGLAND, ASSIGNOR TO WESTERN ELECTRIC COMPANY, INCORPORATED, OF NEW YORK, N. Y., A CORPORATION OF NEW YORK.

SIGNALING SYSTEM.

1,400,050.  Specification of Letters Patent.  Patented Dec. 13, 1921.

Application filed September 5, 1918. Serial No. 252,709.

*To all whom it may concern:*

Be it known that I, BERTRAM B. GRACE, a subject of the King of Great Britain, residing at Upminster, in the county of Essex, England, have invented certain new and useful Improvements in Signaling Systems, of which the following is a full, clear, concise, and exact description.

This invention relates to signaling systems and to signaling devices for use in such systems wherein the signals received are capable of vibrating the diaphragm of a telephonic or like receiving element.

The principal object of the present invention is to provide a signal, the operation of which is controlled by the vibration of the diaphragm of a receiving element to provide a signal distinct from that due to the operation of the usual apparatus used for communication between different stations of the system. In accordance with this feature of the invention a signal receiving device is provided, having a movable element normally maintained against movement by suitable frictional means, and having a vibratory diaphragm, which upon vibration, coöperates with the frictional means to overcome the friction thereof sufficiently to admit of movement of the movable element. In one form of the invention the movable element controls a local circuit for the operation of an electric signal of any suitable type, while in another form of the invention, the movable element serves in itself as a visual indicator, the movement thereof indicating the receipt of a call.

Figure 1:
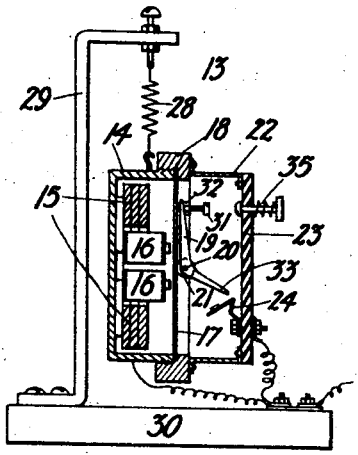
Figure 2:
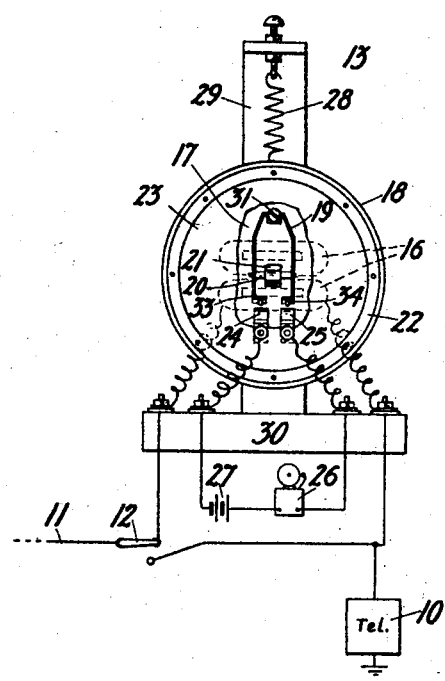

The drawings illustrate different specific embodiments of the invention; Figures 1 and 2 showing one form of the invention in which the operation of the diaphragm actuates a movable switch arm to control the operating circuit of an independent signal; Fig. 1 being a vertical cross section of the controlling device, and Fig. 2 being the end elevation of this device with the plate 23 removed, together with a diagrammatic showing of the signal and the circuit connections essential to the operation of the device and signal.

Figure 3:
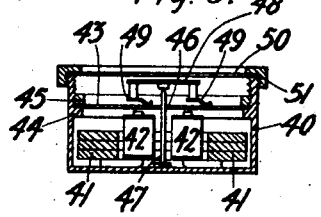
Figure 4:
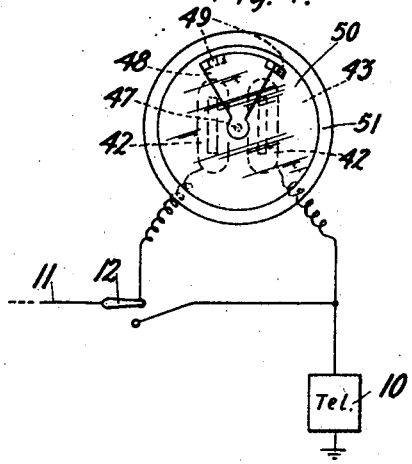

A second form of the invention in which a movable element is moved to give a visual signal upon reception of signaling current to vibrate the diaphragm of the receiving device is illustrated in Figs. 3 and 4; Fig. 3 being a vertical cross-section of the device, and Fig. 4 being a plan thereof, together with the essential circuit connections therefor.

Referring to the specific arrangements shown, which are especially applicable to telephone signaling systems and the like, a telephone set 10 is provided and arranged for connection with a line conductor 11, another line conductor or ground being used as a return path for the line circuit.

Although the sounds produced by the operation of the receiver (not shown) of the set 10 are sufficient to attract the attention of the called party if he is actually using the set, or is in close proximity thereto, it is desirable to provide additional means to signal the called party in event his set is not in use. The additional means is preferably of such a type that it can be located at any convenient position for observation. This signal may be, and in many cases would be, located at some little distance from the telephone set proper and would, upon operation, serve to call the called party to his set.

In the form shown in Figs. 1 and 2, this additional means consists of an automatically operated circuit closer 13, comprising a casing 14, inclosing an electromagnet 15, the coils 16, 16 of which are included in series with the line conductor 11 intermediate the ground connection at this station during engagement of the switch 12 with its upper contact as indicated on the drawing. The switch 12 is preferably maintained in this position, except when the set is in use, but during the use of the set, the switch is operated to engage its lower contact, and disengagement of its upper contact serves to operatively remove the circuit closer 13 from the line circuit.

The electromagnet 15 controls the movement of a vibratory diaphragm 17 secured to the casing 14 by a clamping ring 18. An L-shaped switch 19 is secured intermediate its length to a pivot 20 carried by a supporting member 21 fixed to the diaphragm 17. The pivot 20 is engaged with sufficient friction and the arm 19 is so balanced that the arm will be retained in its normal position as shown in Fig. 1 of the drawing, until the diaphragm 17 in vibrating in response to signaling currents received by the electromagnet 15, overcomes the friction sufficiently to permit movement of the arm. The clamping ring 18 carries housing 22 the outer end of which is closed by a plate 23 preferably of insulation, which carries a pair of contacts 24 and 25. These contacts are connected in a local circuit including a signal 26 and a source of current 27. The circuit closer 13 is supported in such a manner as to be free of ordinary extraneous vibrations. In the present instance this is accomplished by suspending the circuit closer 13 from a support by a spring 28 carried by a supporting member 29 mounted upon a base 30 in such a manner that the diaphragm 17 is normally in a substantially vertical position.

The lever 19 is so proportioned that its upper end bears slightly against the diaphragm 17 under normal conditions, a screw 31 and lock nut 32 being provided at its upper extremity to enable the adjustment of the lever to obtain a proper balance. The lower end of the lever 19 carries two contacts 33 and 34 conductively related and designed to engage the contacts 24 and 25 upon the movement of the lever 19 to circuit closing position.

Upon signaling current flowing through the coils 16 of the electromagnet 15, when the station is signaled, the electromagnet sets the diaphragm 17 into vibration and the vibration of the diaphragm serves to overcome the friction of the pivot 20 sufficiently to jar the lever 19 out of its balanced position, whereupon the contacts 33 and 34 engage contacts 24 and 25 to complete the operating circuit for the signal 26. The signal 26 is accordingly actuated to attract the attention of the called party. This signal, although shown on the drawing as a bell, may obviously be a buzzer, or any other suitable type of signal. The calling party thereupon moves the switch 12 to engage its lower contact, disconnecting the circuit closer 13 from the line circuit, and restores the lever 19 to its normal or receiving position by actuating a restoring key 35 carried by the plate 23 and engageable with the screw to restore the lever to normal.

The called party would now communicate with the calling station in the usual manner and upon finishing with the use of this set would restore the key 12 into engagement with its upper contact ready to receive subsequent signals.

In the form shown in Figs. 3 and 4, the additional signaling means comprises a casing 40 containing an electromagnet 41 having a pair of coils 42 designed to vary the flux of the electromagnet in accordance with current variations due to signal currents passing therethrough. The electromagnet 41 controls the movement of a diaphragm 43 mounted within the casing 40 between an annular shoulder 44 and a clamping ring 45 engaging opposite sides of the diaphragm. The diaphragm 43 is centrally perforated as at 46 and a pivot 47 extends through the opening 46. The casing 40 is designed to be mounted in such a way that the diaphragm 43 thereof is substantially horizontal when in use. A movable element 48 preferably so marked as to contrast with the diaphragm 43 is mounted for rotation upon the pivot 47, and secured to the element 48 are springs 49, the free ends of which are resilient and are bent in the same direction at an acute angle relative to the diaghrapm to normally engage the upper surface of the diaphragm with sufficient friction to prevent rotation of the element 48 so long as the diaphragm remains stationary. Upon vibration of the diaphragm, however, in response to the passage of signaling currents through the coils 42 of the electromagnet, the normal relation of the diaphragm and springs is rapidly changed and serves to rotate the element 48 in the direction opposite to that in which the free ends of the springs are bent. This results from the fact that the diaphragm in vibrating toward the electromagnet allows the ends of the springs to change their angular position and points of engagement relative to the diaphragm due to the resiliency of the springs and the inertia of the element 48, so that upon the return vibration of the diaphragm the springs engage the diaphragm at points slightly to the left of their original position and rotate the element a proportionate distance in a counter-clockwise direction under the resilient action of the springs. Successive vibrations of the diaphragm repeat this action, producing a substantially continuous rotation of the element as long as the diaphragm is maintained in vibration by the signaling currents.

The operator on observing the rotation of the element 48 will know that his set is being signaled and will thereupon move the switch 12 into engagement with its lower contact, disconnecting the electromagnet 41 from the line circuit upon disengaging the switch from its upper contact. The operator will then utilize his set 10 to communicate with the calling party as previously described.

What is claimed is:

1. A signaling device comprising a vibratory diaphragm member having an opening therethrough, a rotatable indicating member, a pivotal support for the indicating member extending through the opening of the diaphragm member, and means carried by one of the members engaging the other member to prevent rotation of the indicating member while the diaphragm member is at rest and operative as a result of the vibration of the diaphragm member to vary the engagement of such means relative to the member it engages to effect continued rotative movement of the indicating member during the maintenance of the diaphragm member in vibration.

2. A signaling device comprising a casing, a vibratory diaphragm carried by the casing and having an axial opening therethrough, electromagnetic means responsive to signaling currents mounted within the casing to effect the vibration of the diaphragm, a rotatable indicating member, a pivotal support for the member carried by the casing and extending through the opening in the diaphragm, and an arm carried by the member having a resilient free end bent at an oblique angle relative to and engaging the diaphragm to prevent rotation of the member while the diaphragm is at rest and operative as a result of the vibration of the diaphragm by such signaling currents to vary the engagement of the free end of the arm with the diaphragm to effect continued rotation of the indicating member during the continuance of such signaling currents.

In witness whereof I hereunto subscribe my name this first day of August, A. D. 1918.

BERTRAM B. GRACE.